Aug. 21, 1928.  
J. D. LEWIS ET AL  
1,681,351  
SPEED CONTROL SYSTEM FOR ELECTRIC ELEVATORS  
Filed July 13, 1922
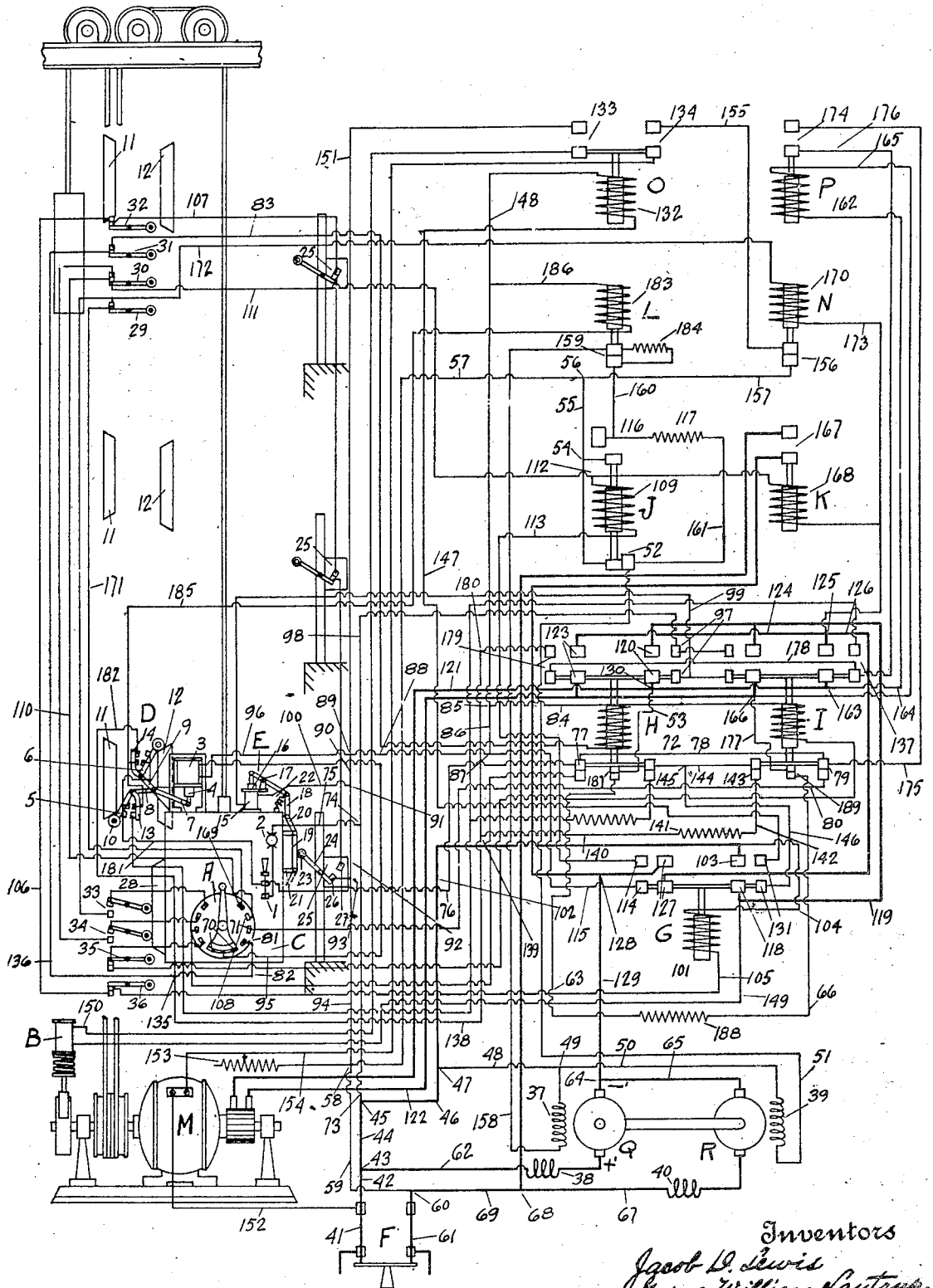
Inventors  
Jacob D. Lewis  
George William Lautrup  
By their Attorney  
L. H. Campbell Patented Aug. 21, 1928.

1,681,351

UNITED STATES PATENT OFFICE.

JACOB D. LEWIS AND GEORGE WILLIAM LAUTRUP, OF YONKERS, NEW YORK, ASSIGNORS TO OTIS ELEVATOR COMPANY, OF JERSEY CITY, NEW JERSEY, A CORPORATION OF NEW JERSEY.

SPEED-CONTROL SYSTEM FOR ELECTRIC ELEVATORS.

Application filed July 13, 1922. Serial No. 574,617.

Our invention relates to the control of direct current motors, and its object is to provide a novel method of, and means for, controlling the speed of such motors.

The particular apparatus that we employ for controlling the speed of a direct current motor for use in any art that such a motor may be used, together of course with other controlling means, if there are any, is a compensator. Herein the compensator is described and shown as used in the elevator art, the illustrations of its use therein being as a means for controlling the speed of the hoisting motor in a car switch controlled elevator. With the compensator there are two methods of obtaining speed control: first, by maintaining constant speed of the compensator; and second, by varying its speed. In either case the speed of the motor to be controlled is governed by means of the fields of the compensator. This specification describes the use of the first form of control as a speed controlling means for elevators.

The compensator comprises two motors mechanically connected by shafting with each other. One of them is employed as a generator as a source of supply for the hoisting motor and is preferably compound wound in order that the voltage supplied by the same to the hoisting motor may stay constant, or nearly so, for different load conditions given to the hoisting motor that it may run at the same speed under the different load conditions, the series field of the generator compensating for the different load conditions as it will as well known. The motor of the compensator is also shown as compound wound but it is not altogether necessary to use such a motor, as any constant speed motor however wound will do. The armature and series field of each are also electrically connected in series in the same electric circuit with each other across the supply lines, the generator alone also adapted to be connected in parallel with the hoisting motor. The shunt field of each is connected in a circuit by itself also across the supply lines. The compensator is adapted to operate in the following manner to control the speed of the hoisting motor. At that time when the elevator hoisting motor is at rest, the shunt field winding of the motor of the compensator is fully excited while the shunt field winding of the generator of the compensator has low excitation, that is to say, a large resistance in the circuit of the field of the generator causes current of low value to be supplied to the field winding. The compensator will at the time in question run at a definite speed and the voltage across the generator will be of a low value and that across the motor of a high value with the sum of these voltages equal to the line voltage. That the voltage across the generator is of a low value is due to the fact that a low value of voltage is applied to its shunt field and that at this time in question there is no load on the generator, therefore its series field is not effected. To condition the hoisting motor to be started, it is first necessary to connect it in parallel with the generator of the compensator; second, the excitation of the shunt field of the generator is increased. As a result, the E. M. F. of the generator is increased and the hoisting motor will accelerate to a definite speed. The resistance hereinbefore said to be in the circuit of the shunt field of the generator was taken out of the circuit of that field to effect the increase in excitation of the field and transferred into the circuit of the shunt field of the motor of the compensator; the transition of the resistance from one field to the other being accomplished in such a way that the resistance of the field circuit of the generator was decreased before the resistance of the field circuit of the motor of the compensator was increased. As a consequence the excitation of the field of the generator was increased to the amount that the excitation of the field of the motor was decreased. Therefore the E. M. F. generated by the generator combined with the C. E. M. F. of the motor equaled the line voltage so that there was little or no change in speed of the compensator. The voltage generated by the generator may now be the same or less than that of the supply lines. At this time the motor of the compensator is short circuited, leaving the generator now to run free as a motor across the supply lines, and the hoisting motor to be supplied from the same. The hoisting motor is further accelerated by inserting a resistance in its field which brings the hoisting motor up to the required speed. In stopping the hoisting motor, the reverse operation takes place, i. e. the voltage of the motor of the compensator is gradually increased while that of the generator is correspondingly decreased.

That the compensator means of speed control offers advantages over other known methods of control for elevators is obvious from the following: each elevator is self contained; simplicity of control board, as the armature current is not controlled; only small magnets required to handle field current; smoothness of operation; compensator not used when running full speed, being used only in starting, as means to accelerate the speed, and in stopping, as means to decelerate the speed; and a notable reduction of power consumption over other methods of control.

Reference being made to the figure, which shows diagrammatically an embodiment of our invention, the description begins by first designating the various parts and thereafter pointing out the system of circuits, showing how they act on the different parts to effect the desired results.

An elevator car C is provided with a controlling switch, A, the car being operatively connected to an electric motor M by means of the usual suspension cables. In the car is a normally closed emergency safety switch 1 and a gate switch 2; the emergency switch for the purpose of enabling the attendant in the car to stop the car at any point in its travel, and the gate switch for the purpose of conditioning the controlling circuits to enable the car to be operated when the car gate is closed. If, when the car is operating, should the car gate be opened, thereby opening the gate switch, the car will be brought to a stop, all of which is old and well known. On the top of the car, is a winding 3 of a levelling switch D, the purpose of this switch being to cause the car to be brought to a level with the floor landings in stopping. The operation of the switch D is as follows: Assume that the car is approaching a floor at which it is desired to stop and that the winding of the leveling switch is deenergized before the car arrives within the leveling zone for that floor. Thereupon the switch will take a position as shown in the figure, but outside the zone of the leveling cams, by reason of the release of the plunger 4 of the switch dropping by gravity which motion of dropping is transmitted to the arms 5 and 6 of the switch by the lever 7 secured by one of its ends to the plunger, and the levers 8 and 9 each secured at one of their ends to the other end of the lever 7 and their other ends to the arms 5 and 6 respectively of the switch. Supposing that the car is approaching the first floor landing in a down direction of travel, the roller 10 affixed to the arm 5 will strike a cam 11 at that floor, of which cams there is one for each floor landing, and an opposite cam 12 also for each floor landing. The roller 10 in striking the cam 11 will be cammed inwardly together with the arm 5 to which it is attached. The camming of the roller and its arm inwardly will cause contacts on that arm to engage other contacts on another arm 13 of the switch which serves to keep close a circuit to the motor M to continue its operation of lowering the car. The motor continues to lower the car until that time when the roller 10 rolls off the cam 11 which rolling of the roller off of the cam serves to open the engagement of the contacts of the arms 5 and 13 with each other, which results in the motor stopping and likewise the car which is now level with the floor landing. The operation of the switch D is similar when the approach of the car to a floor landing to stop thereat is in an up-direction; arm 6 of the switch at such a time being operated when it engages the cam, 12, of the floor desired to be stopped at, and the cam, 6, by its contacts engaging other contacts on another arm, 14, of the switch.

Also upon the top of the car is mounted the winding 15 of a door locking and unlocking device, E, the winding having a plunger 16 to which is fastened a lever pivoted at 17 near its center, and having its other end connected by a rod 18 to a cam 19, which is movably attached to the car by links 20 and 21 which are pivoted to the car. A small spring 22 tends to keep the cam in its outward position, such position being normal and is the one shown in the drawing. When the winding 15 becomes energized the plunger 16 will be pulled against the action of the spring, thus lifting the cam 19 through the lever and the rod 18. While the cam is being lifted by the energized winding, the links 20 and 21 will cause the cam to be moved inwardly toward the side of the car. The cam 19 when in its extended position is adapted to strike the roller 23 on the lever 24 of the door lock 25, of which door lock there is one on the door of each floor landing. When the cam 19 strikes the roller of the door lock of a desired floor landing wished to be stopped at, the door is unlocked and the electrical connections in the lock broken, interrupting the circuit in which the contacts 26 and 27 of the lock are, and in which circuit all the door contacts are connected in series.

To one side of the car is affixed a cam 28 and in the path of same are limit switches 29, 30, 31 and 32 at the top of the hatchway, and limit switches 33, 34, 35 and 36 at the bottom of the hatchway, in which the car travels. These limit switches when operated by the cam are for the purpose of stopping the car should it run past the terminal floor landings, due to failure of the normal stopping devices. Other parts not mentioned heretofore are as follows: an electromagnet brake B for the motor; a main line knife switch F through which a direct current supply is obtained; an electromagnetically operated potential switch G; electromagnetically operated reversing switches H and I controlling the directions of current flow supplied to the motor; an electromagnetically operated field switch J for the compensator, the switch comprising two movable contacts and two stationary contacts, one of the movable contacts adapted to engage its corresponding stationary contact before the other movable contact disengages contact with its corresponding stationary contact. Additional parts are: an electromagnetically operated final accelerating switch K; an additional electromagnetically operated field switch L for the compensator; an electromagnetically operated fast speed switch N; an electromagnetically operated brake and field switch O; and an electromagnetically operated holding switch P for holding the reversing switches closed. The compensator, the particular part of the apparatus of the present system of control comprises two motors Q and R mechanically connected with each other and electrically connected in the same electric circuit with each other across the supply line, as stated hereinbefore. The motor Q serves as the generator of the compensator and, therefore, will be hereinafter termed generator. The windings of the generator Q are shunt field winding 37 and series field winding 38; and the windings of the motor R are shunt field winding 39 and series field winding 40. The direction of rotation of the motor and generator of the compensator is always in one and the same direction.

The parts as shown are in their normal positions with the car at rest. Let it be assumed that the operator in the car desires to go up, and that he moves the lever of the car switch A to the left so that the car switch segment moved by the lever engages contacts 20, 81 and 71 of the switch. A circuit is thereby established for the winding 72 of the up-reversing switch H for operating that switch, which is as follows: from plus main, through blade 41 of the knife switch F, by wire 42, junction point 43, by wire 44, junction point 45, by wire 73, junction point 74, by wire 75, through the gate switch 2, now closed by the gate of the car, the gate being closed as required in order to operate the car as stated hereinbefore, through the safety switch 1, by wire 76, contact 77 of the reversing switch H, by wire 78, through contacts 79 of the down-reversing switch I, by wire 80, contact 71 of the car switch, contact 81 of the switch, as it is now bridged with contact 71 by the car switch segment, by wire 82, junction point 135, by wire 136, through limit switch 31, by wire 83, through the winding 72 of the up-reversing switch H, by wire 84, junction point 85, by wire 86, junction point 87, by wire 88, junction point 89, by wire 90, junction point 91, by wire 92, junction point 93, by wire 94, junction point 58, by wire 59, junction point 60, blade 61 of the knife switch F, to the minus main. A circuit has also been establish to the winding 3 of the leveling switch D for that switch to operate by the movement of the lever of the car switch A. The circuit is as follows: starting at this time from the contacts 71 of the car switch, as the circuit from the plus main to the contacts 71 is the same as traced before, from the contact 71, contact 70 of the switch, as they are bridged by the car switch segment, by wire 95, through the winding 3 of the leveling switch, by wire 96, and junction 89 to the minus main as before. The leveling switch is now operated and pulls its plunger 4 up within itself which movement is carried to the arms 5 and 6 of the switch which are caused to be positioned vertically so that when the car starts they and the rollers on them are clear of the cams 11 and 12. Having operated the reversing switch H, it closes by its contacts 97 a circuit to the winding 15 of the door locking and unlocking device E for that switch to operate. The circuit is as follows: as the plus feed follows to the junction point 74 the circuit from there is by wire 98, through the contacts 97 of the reversing switch, by wire 99, through the winding 15 of the door locking device, by wire 100 and junction point 91 to the minus main. The door locking device will operate its cam 19 as related, the contacts 26 and 27 of the door at the first floor landing closing if the door is closed. The closing of the contacts establishes a circuit to the winding 101 of the potential switch for that switch to close. The circuit is as follows: from the plus main by wire 102, to the contact 103 of the potential switch, by wire 104, through the winding 101 of the switch, by wire 105, through the limit switch 36, by wire 106, through the limit 32, by wire 107, through the contacts of all the doors, junction point 93, to the minus main.

Moving the lever of the car switch A still farther to the left so that the car switch segment engages a contact 108 of the switch, a circuit is established to the winding 109 of the field switch J for operating that switch; the circuit is as follows: starting at this time from the contact 71 of the car switch, as the circuit from the plus main switch, as the circuit from the plus main follows up to this point, through the car switch segment and contact 108, by wire 110, through the limit switch 30, by wire 111, junction point 112, through the winding 109 of the switch J, by wire 113, through contacts 114, now closed, of the potential switches, by wire 115, junction point 87, by wire 88, and junction point 89, to the minus main. The field switch J operates by the closing of the circuit just traced, and closes its top contacts and opens its bottom contacts, closing its top contacts first before its bottom contacts are opened, as related hereinbefore. The closing of its top contacts 116, cuts out of circuit of the field 37 of the generator Q a resistance 117, that hereinbefore was said to be in the circuit to the field, connecting the field now across the supply mains. The opening of the bottom contacts 52 of the switch places the resistances 117 in the circuit to the field 39 of the motor R, the top contacts of the switch closing first before the transition takes place. As a consequence the excitation of field 37 of the generator Q has been increased to the amount that the excitation of the field 39 of the motor R has been decreased. The circuit for the field 37 of the generator Q may be traced at the time in question, that is with the resistance 117 now out of its circuit as follows: starting at the junction point 47, as the plus feed follows to this point, by wire 48, junction point 49, through the field 37 of the generator, by wire 158, through contacts 159 of the field switch L, by wire 160 through contacts 116 now closed of the field switch J, junction point 54, by wire 55, junction point 56, by wire 57, junction point 58, by wire 59, junction point 60, and blade 61 of the knife switch F, to the minus main. The circuit for the field 39 of the motor R at the time in question is traced as follows: that is with the resistance 117 now in the circuit to the field; starting at this time from junction point 49, by wire 50, through the field 39, by wire 51, contact 52 of the field switch J now separated from its corresponding movable contact, by wire 161, through the resistance 117, through contacts 116 of the field switch now closed, junction point 54, to the minus main as traced before. The armatures of generator Q and motor R are connected in series and across the main supply line as follows: from the plus supply main, blade 41 of knife switch F, by wire 42, junction point 43, by wire 62, through the series field 38 and armature of generator Q, junction point 64, by wire 65, through the armature and the series field 40 of motor R, by wire 67, junction point 68, by wire 69, junction point 60, to the minus main through the blade 61 of the knife switch F. Since the field of generator Q was excited to the amount that the field of motor R was decreased, the E. M. F. generated by the generator Q combined with the C. E. M. F. of motor R will equal the line voltage so that there was little or no change in speed in the compensator. Since the hoisting motor M is connected in parallel with the generator, the voltage generated by the generator Q is applied to it. This connection has already been made since it was told hereinbefore, that the reversing switch H and the potential switch G were operated. The brake B was also released upon the closing of those two switches, the brake being released in the following manner. The closing of the potential switch G by its contacts 131 closed a circuit to the winding 132 of the brake and field switch O, for it to operate which by its set of contacts 133 closes the circuit to release the brake and by its other set of contacts 134, closes a circuit shorting a resistance 153 in circuit with the field of the hoisting motor M that that motor in starting may start on a strong field. The circuit including the winding 132 of the brake and field switch O is as follows: starting from the contact 71 of the car controlling switch A, through the car switch segment and contact 81 of the car switch, by wire 82, junction point 135, by wire 138, junction point 139, by wire 140, through resistance 141, by wire 142, through contacts 143 of the down-reversing switch I, by wire 144, junction point 145, by wire 146, through the contacts 131, now closed, of the potential switch G, by wire 147, through the winding 132 of the brake and field switch O, by wire 148, junction point 85, by wire 86, junction point 87, by wire 88, junction joint 89, to the minus main as traced hereinbefore. The circuit to the brake B is as follows: starting from the contacts 103 and 118, now closed, of the potential switch G, by wire 149, through the winding of the brake, by wire 150, through contacts 133, now closed, of the brake and field switch O, by wire 151, and junction point 89 to the minus main. The circuit including the field of the hoisting motor M is as follows: from the plus main, blade 41 of knife switch F, by wire 152, through the field of the motor, by wire 154, through the contacts 134, now closed, of the brake and field switch O, by wire 155, through contacts 156 of the fast speed switch N, by wire 157, junction point 56, by wire 57, junction point 58, to the minus main. The circuit that the motor M is in is as follows: it paralleling that part of the circuit, namely between junction points 43 and 64, including the generator Q which at the time the circuit was traced was motor Q. The circuit is from the +' side of the generator Q, by wire 62, junction point 43, by wire 44, junction point 45, by wire 46, junction point 47, by wire 102, through the contacts 103 and 118 of the potential switch, by wire 119, through contacts 120 of the up-reversing switch H, junction point 130, by wire 121, through the motor M, by wire 122, through contacts 123 of the reversing switch, by wire 124, junction point 125, by wire 126, through contacts 127 of the potential switch, junction point 128, by wire 129, to the −' side of the generator. As a result of the connecting of the hoisting motor M across the generator Q and the gradual increase in the voltage of generator Q due to the gradual building up of the generator field strength, the hoisting motor starts and gradually increases its speed. The winding 162 of the holding switch P has been energized for it to close the contacts of the switch by the C. E. M. F. of the hoisting motor, the switch being adapted to operate at a small value of the C. E. M. F. of the hoisting motor. There is no significance to the switch operating at this time other than that it has closed its contacts. The circuit for its winding 162 is as follows: the circuit is started from the junction point 163 as the feed from one side of the hoisting motor follows up to this point, by wire 164, through the winding 162 of the hoisting switch P, by wire 165, and junction point 166 to the other side of the hoisting motor. The final accelerating switch K is also operated to close its contacts 167 by the winding 168 of the switch when a predetermined value of C. E. M. F. of the hoisting motor is obtained, and which value has now been obtained. The switch when operated short circuits the motor R of the compensator, leaving the generator Q to run free as a motor across the supply mains. To further increase the speed of the hoisting motor, it is necessary to move the lever of the car controlling switch still farther to the left. Assuming that the lever has been farther moved to the left and that the car switch segment now engages another contact 169 of the switch, a circuit to the winding 170 of the fast speed switch N is established for operating that switch. This switch is operated by the C. E. M. F. of the hoisting motor, when a predetermined value of the same is obtained which the motor must now possess as it cannot further accelerate in speed above that which it is now running at until the car switch lever has been further moved. The lever having been moved as told, the circuit for operating the winding 170 of the fast speed switch is as follows: starting from the contact 71 of the car switch, as the feed follows from one side of the motor up to this point, through contact 169, it being connected to the contact 71 by the car switch segment, by wire 171, through the limit switch 29, by wire 172, through the winding 170 of the fast speed switch, by wire 173, junction point 125, and through the contacts 123 of the reversing switch H to the other side of the hoisting motor. The fast speed switch N therefore operates as a result of the circuit established, just traced, and opens its contacts 156 which places the resistance 153, that was before shorted by the closing of the contacts 134 of the brake and field switch O, in circuit with the field of the hoisting motor which allows the speed of the motor to increase. The hoisting motor is now operating at its greatest speed and hoisting the car in the up-direction. It will be assumed that the present travel of the car is up to the second floor, that a position opposite a predetermined point from the second floor has been reached. The operator knowing that he has reached a particular point from the floor, will release or center the lever of the car controlling switch A; the contact 169 of the switch is the first disengaged, the disengagement of which serves to return the fast speed switch N to its normal position and as was told that switch was the means through which the hoisting motor obtained its fast speed. The speed of the hoisting motor has therefore been reduced. The contact 108 is the next that disengagement was made from, which serves to open the circuits to the final accelerating switch K and the field switch J. Both switches are therefore returned to their normal positions, the switch K serving to remove the short circuit across the motor R of the compensator, and the switch J to remove the resistance 117 from the circuit of the field of the motor R and replace it in the circuit of the generator Q. As a result, the voltage across the armature of the motor R increases while the voltage of the generator Q, and therefore the voltage applied to the hoisting motor M, decreases. The speed of the hoisting motor has therefore been greatly reduced. The leveling switch D was also returned to its normal position by the centering of the car controlling switch A, which opened the circuits to its winding 3. It may be supposed that the circuit to the reversing switch was also broken by the car controlling switch lever being brought to center position if the centering of the switch was before the car had run into the leveling zone. But this is not so in the present case because the reversing switch is held closed by a circuit through the contacts 174 of the holding switch P, which switch was hereinbefore described as operated by the C. E. M. F. of the hoisting motor and by a small value of the same, so that during the interval of time between the centering of the lever of the car controlling switch A and that time that the car runs into the leveling zone by virtue of its coasting, so to speak, provided that the said switch was not centered too great a distance from the leveling zone of the desired floor to be stopped at, the reversing switch is held closed. The circuit for holding the reversing switch closed is as follows: starting from the contacts 79 of the reversing switch I as the feed from the plus main follows up to this point, by wire 175, through the contacts 174 of the holding switch P, by wire 176, contacts 137 of the reversing switch I, by wire 178, through contacts 179, still held closed, of the reversing switch H, by wire 180, junction point 139, by wire 138, junction point 135, by wire 136, through the limit switch 31, by wire 83, through the winding 72 of the reversing switch H, by wire 84, junction point 85, by wire 86, junction point 87, by wire 88, junction point 89, to the minus main. Upon the car running into the leveling zone the circuit held closed just traced for maintaining the reversing switch operated is picked up so to speak by the leveling switch D, the roller on the arm 6 of the switch engaging with the cam 12 of the second floor landing, which engagement serves to move the arm inwardly, the contacts on the same engaging corresponding contacts on the other arm 14 of the switch. The circuit for holding the reversing switch closed at this time is by means of the upper contacts on the arm 6 now engaged with the corresponding upper contact on the arm 14. The circuit is as follows: starting from the safety switch 1 in the car, by wire 181, through the contacts designated of the switch D, by wire 182 and junction point 135, to and through the winding 72 of the reversing switch H as before traced. Since the reversing switch is held closed so also is the door locking and unlocking device E held operated. The potential switch is also held closed by the reversing switch, the potential switch by its contacts 131 holds closed a circuit for holding off the brake B of the motor. The circuit to the brake B was hereinbefore told as made by the closing of the contacts 133 of the brake and field switch O, and that switch was made to operate by the closing of the contacts 131 of the potential switch. The circuit to the winding 132 of the switch O at this time is as follows: starting from the safety switch 1, by wire 181, through the upper contacts of both the arms 6 and 14 of the leveling switch, by wire 182, junction point 135, to and through the winding 132 as hereinbefore traced. The engagement with each other of the lower contacts on the arms 6 and 14 of the leveling switch D serves to establish a circuit to the winding 183 of the field switch L, which when operated opens its contacts 159, thereby inserting a resistance 184, into the circuit of the field 37 of the generator of the compensator which reduces the strength of the field, consequently the voltage of the generator is reduced and also that across the hoisting motor which is further reduced in speed. The circuit to the winding 183 of the field switch L is as follows: starting from the safety switch 1, by wire 181, through the lower contacts on the arms 6 and 14, by wire 185, through the winding 183 of the switch L, by wire 186, junction point 85, by wire 86, junction point 87, by wire 88, and junction point 89, to the minus main. At the time the roller on the arm 6 of the switch D rolls off of the cam 12, which rolling off the same serves to move the arm 6 on which it is fastened away from the arm 14, the contacts of both arms are disengaged from each other, the disengagement of which serves to open the circuits to the winding of the remaining switches operated, namely the reversing switch H, door locking and unlocking device E, the potential switch G, brake and field switch O, and the field switch F. The switches opening the circuits they hold closed. The reversing switch in opening opens the circuit to the hoisting motor M, and places by its contacts 187, which close when the switch opens, a resistance 188 across the hoisting motor for it to come to rest dynamically. The dynamic brake circuit is as follows: starting from the junction point 130, by wire 53, through the contacts 187 now closed of the reversing switch H, by wire 63, through the resistance 188, by wire 66, through contacts 189 of the reversing switch I, by wire 177, to junction point 166. The brake B serves to hold the motor at rest after it has stopped. The car is now stopped level with the second floor landing and the door at that landing has been unlocked by the cam of the device E, which was caused to assume its normal position by the opening of the reversing switch H. A passenger in the car desiring to get out at the second floor can now do so, if or when the car gate has been opened.

Having thus described the invention, and with a car switch controlled elevator, what we claim as new and desire to secure by Letters Patent of the United States is:

1. A system of control for an electric work motor, comprising in combination, a source of current, a motor generator set having the armatures of the motor and the generator connected in series to said source of current, means for connecting the armature of the work motor in parallel with the armature of the generator, and means for connecting under certain operating conditions the armature of the work motor directly to the source of current while maintaining said armature connected to the armature of said generator.

2. A system of control for on electric work motor, comprising in combination, a source of current, a motor generator set having the armatures of the motor and the generator connected in series to said source of current, means for connecting the armature of the work motor in parallel with the armature of the generator, and automatic means dependent upon the speed of the work motor for connecting its armature directly to the source of current while maintaining said armature connected to the armature of said generator.

3. An electric elevator system, comprising in combination, an elevator car, a hoisting motor, a source of current, a motor generator set having the armature of the motor and the generator connected in series and field windings for said motor and generator connected in parallel to said source of current, a reversing switch for connecting the armature of the hoisting motor in parallel with the armature of the generator, a resistance adapted to be selectively inserted in the circuit of one or the other of said field windings for varying the voltage supplied to said hoisting motor, manual means for controlling the insertion of said resistance, a second resistance adapted to be inserted in the circuit of the field of the generator, in addition to said first resistance, for further varying the voltage supplied to said hoisting motor, and leveling means actuated by movement of the elevator car to control the insertion of said second resistance and the operation of said reversing switch for leveling the elevator car at the landings.

In testimony whereof, we have signed our names to this specification.

JACOB D. LEWIS.
GEORGE WM. LAUTRUP.